(12) United States Patent
Lin

(10) Patent No.: US 11,782,636 B2
(45) Date of Patent: Oct. 10, 2023

(54) METHOD FOR DATA PROCESSING OF AN INTERCONNECTION PROTOCOL TO SUPPORT MULTIPLE LANES, CONTROLLER, AND STORAGE DEVICE

(71) Applicant: SK hynix Inc., Icheon-si (KR)

(72) Inventor: Wen Jyh Lin, Zhubei (TW)

(73) Assignee: SK hynix Inc., Icheon-si (KR)

( * ) Notice: Subject to any disclaimer, the term of this patent is extended or adjusted under 35 U.S.C. 154(b) by 106 days.

(21) Appl. No.: 17/559,438

(22) Filed: Dec. 22, 2021

(65) Prior Publication Data

US 2023/0072876 A1 Mar. 9, 2023

(30) Foreign Application Priority Data

Sep. 9, 2021 (TW) ................................. 110133525

(51) Int. Cl.
| | |
|---|---|
| *G06F 3/06* | (2006.01) |
| *G06F 13/42* | (2006.01) |
| *G06F 13/38* | (2006.01) |
| *G06F 13/14* | (2006.01) |

(52) U.S. Cl.
CPC .......... *G06F 3/0655* (2013.01); *G06F 3/0604* (2013.01); *G06F 3/0679* (2013.01); *G06F 13/14* (2013.01); *G06F 13/387* (2013.01); *G06F 13/42* (2013.01)

(58) Field of Classification Search
CPC .... G06F 3/0655; G06F 3/0679; G06F 3/0604; G06F 13/42
See application file for complete search history.

(56) References Cited

U.S. PATENT DOCUMENTS

| | | | |
|---|---|---|---|
| 8,335,958 B2 | 12/2012 | Van Den Hamer et al. | |
| 8,402,343 B2 | 3/2013 | Radulescu | |
| 9,223,380 B2 | 12/2015 | Radulescu | |
| 9,973,216 B2 | 5/2018 | Radulescu | |
| 2007/0237076 A1 | 10/2007 | Balandin et al. | |
| 2017/0070381 A1* | 3/2017 | Chellappan | H04L 43/0823 |
| 2020/0341825 A1 | 10/2020 | Sudarmani et al. | |
| 2023/0072876 A1* | 3/2023 | Lin | G06F 13/1678 |

FOREIGN PATENT DOCUMENTS

| | | |
|---|---|---|
| WO | 2007083278 A1 | 7/2007 |
| WO | 2018004984 A1 | 1/2018 |

* cited by examiner

*Primary Examiner* — David E Martinez
(74) *Attorney, Agent, or Firm* — WILLIAM PARK & ASSOCIATES LTD.

(57) ABSTRACT

A method for data processing of an interconnection protocol, a controller and a storage device, the method comprising in processing of frame sending by a first device to a second device: allocating a plurality of start-of-frame (SOF)-included protocol data units (PDUs) to a designated lane among a plurality of active lanes of the first device; and configuring a PDU distance among the plurality of start-of-frame (SOF)-included protocol data units to be greater than or equal to a product of a maximum bus width of a lane of the interconnection protocol and a quantity of the plurality of active lanes. Accordingly, the method can help greatly reduce the complexity of the hardware protocol engine implemented under the interconnection protocol, especially the complexity of the decoder in the data link layer receiver, thus reducing the difficulty of research and development, verification and maintenance.

12 Claims, 16 Drawing Sheets

FIG.5

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1 | ESC_DL | | | | | | | SOF | | | | TC | | | reservation | |
| 0 | L2 payload | | | | | | | | | | | | | | | |
| 0 | L2 payload | | | | | | | | | | | | | | | |
| 0 | L2 payload | | | | | | | | | | | | | | | |
| 1 | ESC_DL | | | | | | | EOF_EVEN | | | | frame serial number | | | | |
| 0 | CRC-16 | | | | | | | | | | | | | | | |

FIG.6

| DL_TX | symbol 0 | symbol 1 | symbol 2 | symbol 3 | symbol 4 | symbol 5 | symbol 6 | symbol 7 | symbol 8 | symbol 9 | symbol 10 | symbol 11 | symbol 12 | symbol 13 | symbol 14 | symbol 15 |
|---|---|---|---|---|---|---|---|---|---|---|---|---|---|---|---|---|
| clock cycle N | TC.SOF | PDU | EOF | CRC | | | | | | | | | | | | |
| clock cycle N+1 | | TC.SOF | PDU | EOF | CRC | | | | | | | | | | | |
| clock cycle N+2 | | | TC.SOF | PDU | EOF | CRC | | | | | | | | | | |
| clock cycle N+3 | | | | TC.SOF | PDU | EOF | CRC | | | | | | | | | |

| clock cycle N+1 | TC.SOF | PDU | EOF | CRC | FLR | FLR | FLR | FLR | FLR | FLR | FLR | FLR | PDU | EOF | CRC |
| --- | --- | --- | --- | --- | --- | --- | --- | --- | --- | --- | --- | --- | --- | --- | --- |
| | FLR | FLR | FLR | FLR | FLR | FLR | FLR | FLR | FLR | FLR | FLR | FLR | FLR | FLR | FLR |
| | FLR | FLR | FLR | FLR | FLR | FLR | FLR | FLR | FLR | FLR | FLR | FLR | FLR | FLR | FLR |
| | FLR | FLR | FLR | FLR | FLR | FLR | FLR | FLR | FLR | FLR | FLR | FLR | FLR | FLR | FLR |

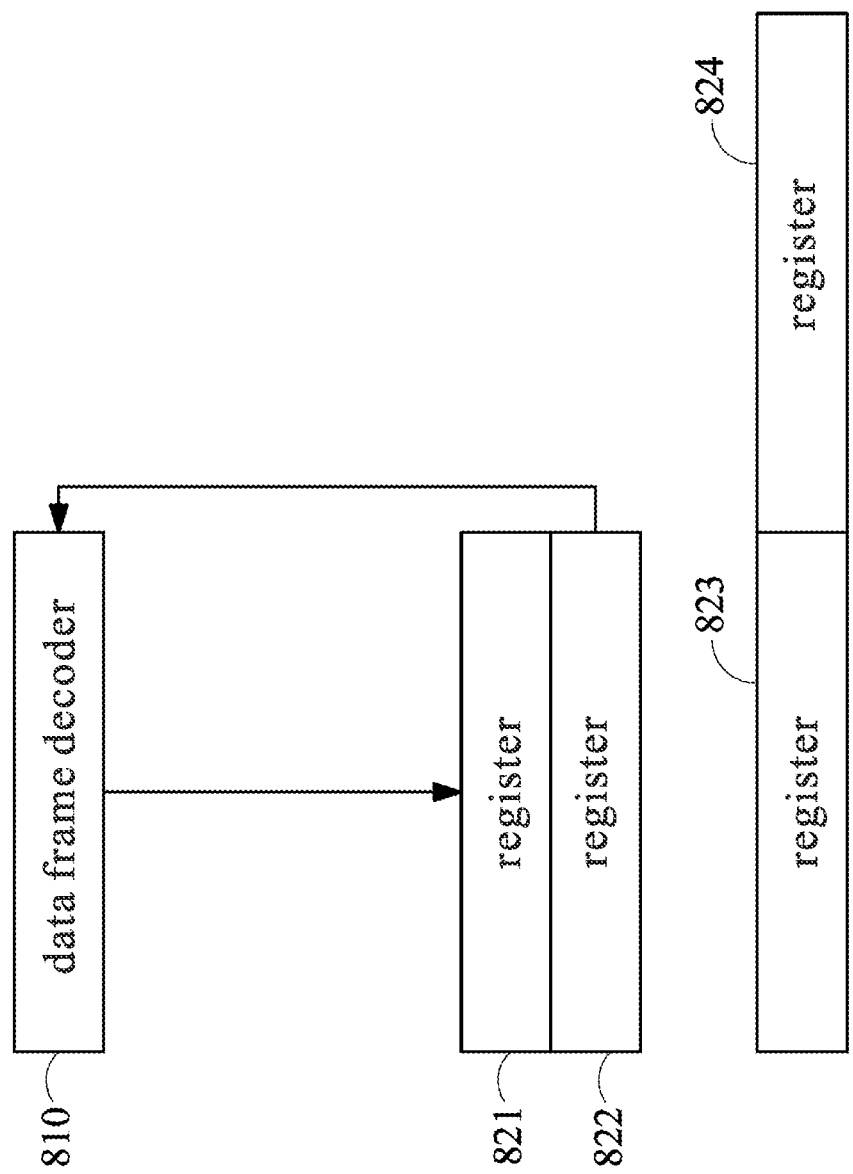

FIG. 10

| DL TX | symbol 0 | symbol 1 | symbol 2 | symbol 3 | symbol 4 | symbol 5 | symbol 6 | symbol 7 |
|---|---|---|---|---|---|---|---|---|
| clock cycle N | TC.SOF | PDU | EOF | CRC | FLR | FLR | FLR | FLR |
| clock cycle N+1 | TC.SOF | PDU | EOF | CRC | FLR | FLR | FLR | FLR |

| | lane 0 (64 bits) | | | | lane 1 (64 bits) | | | |
|---|---|---|---|---|---|---|---|---|
| PA TX | | | | | | | | |
| clock cycle M | TC.SOF | EOF | | | PDU | CRC | | |
| clock cycle M+1 | TC.SOF | EOF | | | PDU | CRC | | |

FIG. 11

| | lane 0 (64 bits) | | | | lane 1 (64 bits) | | | |
|---|---|---|---|---|---|---|---|---|
| PA RX | | | | | | | | |
| clock cycle M | TC.SOF | EOF | | | PDU | CRC | | |
| clock cycle M+1 | TC.SOF | EOF | | | PDU | CRC | | |
| DL RX | symbol 0 | symbol 1 | symbol 2 | symbol 3 | symbol 4 | symbol 5 | symbol 6 | symbol 7 |
| clock cycle N | TC.SOF | PDU | EOF | CRC | FLR | FLR | FLR | FLR |
| clock cycle N+1 | TC.SOF | PDU | EOF | CRC | FLR | FLR | FLR | FLR |

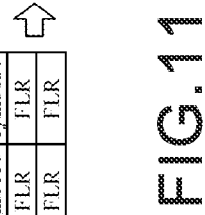

| TC.SOF | PDU | EOF | CRC | FLR | FLR | FLR | FLR |
|---|---|---|---|---|---|---|---|
| TC.SOF | PDU | EOF | CRC | FLR | FLR | FLR | FLR |

| PA RX | lane 0 (64 bits) | | | | | | | lane 1 (64 bits) | | | | | | |
|---|---|---|---|---|---|---|---|---|---|---|---|---|---|---|
| clock cycle M | | | | | TC.SOF | EOF | | | | | | | PDU | CRC |
| clock cycle M+1 | | | | | TC.SOF | EOF | | | | | | | PDU | CRC |
| DL RX | symbol 0 | symbol 1 | symbol 2 | symbol 3 | | | | symbol 4 | symbol 5 | symbol 6 | symbol 7 | | | |
| clock cycle N | FLR | FLR | FLR | PDU | TC.SOF | EOF | | FLR | CRC | FLR | FLR | | | |
| clock cycle N+1 | FLR | FLR | FLR | PDU | TC.SOF | EOF | | FLR | CRC | FLR | FLR | | | |

| | | |
|---|---|---|
| TC.SOF | PDU | EOF | CRC |
| TC.SOF | PDU | EOF | CRC |

FIG. 12

| PA RX | lane 0 (64 bits) | | | | | | | lane 1 (64 bits) | | | | | | |
|---|---|---|---|---|---|---|---|---|---|---|---|---|---|---|
| clock cycle M | | | | | TC.SOF | EOF | | | | | | | PDU | CRC |
| clock cycle M+1 | | | | | TC.SOF | EOF | | | | | | | PDU | CRC |
| DL RX | symbol 0 | symbol 1 | symbol 2 | symbol 3 | symbol 4 | | | symbol 5 | symbol 6 | symbol 7 | | | | |
| clock cycle N | FLR | FLR | FLR | FLR | TC.SOF | PDU | | EOF | CRC | | | | | |
| clock cycle N+1 | FLR | FLR | FLR | FLR | TC.SOF | PDU | | EOF | CRC | | | | | |

| | | |
|---|---|---|
| TC.SOF | PDU | EOF | CRC |
| TC.SOF | PDU | EOF | CRC |

|  | symbol 0 | symbol 1 | symbol 2 | symbol 3 |
|---|---|---|---|---|
| clock cycle N | TC.SOF | PDU | EOF | CRC |
| clock cycle N+1 | TC.SOF | PDU | EOF | CRC |
| clock cycle N+2 | TC.SOF | PDU | EOF | CRC |
| clock cycle N+3 | TC.SOF | PDU | EOF | CRC |

PA TX

|  | lane 0 (32 bits) | | lane 1 (32 bits) | |
|---|---|---|---|---|
| clock cycle M | TC.SOF | EOF |  |  |
| clock cycle M+1 | TC.SOF | EOF | PDU | CRC |
| clock cycle M+2 | TC.SOF | EOF | PDU | CRC |
| clock cycle M+3 | TC.SOF | EOF | PDU | CRC |

PA RX / DL RX

|  | lane 0 (64 bits) | | | | lane 1 (64 bits) | | | |
|---|---|---|---|---|---|---|---|---|
| PA RX clock cycle M | TC.SOF | EOF | TC.SOF | EOF | PDU | CRC | PDU | CRC |
| clock cycle M+1 | TC.SOF | EOF | TC.SOF | EOF | PDU | CRC | PDU | CRC |
| DL RX | symbol 0 | symbol 1 | symbol 2 | symbol 3 | symbol 4 | symbol 5 | symbol 6 | symbol 7 |
| clock cycle N | TC.SOF | PDU | EOF | CRC | TC.SOF | PDU | EOF | CRC |
| clock cycle N+1 | TC.SOF | PDU | EOF | CRC | TC.SOF | PDU | EOF | CRC |

| DL TX | symbol 0 | symbol 1 | symbol 2 | symbol 3 |
|---|---|---|---|---|
| clock cycle N | TC.SOF | PDU | EOF | CRC |
| clock cycle N+1 | FLR | FLR | FLR | FLR |
| clock cycle N+2 | TC.SOF | PDU | EOF | CRC |
| clock cycle N+3 | FLR | FLR | FLR | FLR |
| clock cycle N+4 | TC.SOF | PDU | EOF | CRC |
| clock cycle N+5 | FLR | FLR | FLR | FLR |
| clock cycle N+6 | TC.SOF | PDU | EOF | CRC |
| clock cycle N+7 | FLR | FLR | FLR | FLR |

| PA TX | lane 0 (32 bits) | | lane 1 (32 bits) | |
|---|---|---|---|---|
| clock cycle M | TC.SOF | EOF | PDU | CRC |
| clock cycle M+1 | FLR | FLR | FLR | FLR |
| clock cycle M+2 | TC.SOF | EOF | PDU | CRC |
| clock cycle M+3 | FLR | FLR | FLR | FLR |
| clock cycle M+4 | TC.SOF | EOF | PDU | CRC |
| clock cycle M+5 | FLR | FLR | FLR | FLR |
| clock cycle M+6 | | | | |
| clock cycle M+7 | FLR | FLR | FLR | FLR |

| PA RX | lane 0 (64 bits) | | | | lane 1 (64 bits) | | | |
|---|---|---|---|---|---|---|---|---|
| clock cycle N | TC.SOF | EOF | FLR | FLR | PDU | CRC | FLR | FLR |
| clock cycle N+1 | TC.SOF | EOF | FLR | FLR | PDU | CRC | FLR | FLR |
| clock cycle N+2 | TC.SOF | EOF | FLR | FLR | PDU | CRC | FLR | FLR |
| clock cycle N+3 | TC.SOF | PDU | FLR | FLR | PDU | CRC | FLR | FLR |
| DL RX | symbol 0 | symbol 1 | symbol 2 | symbol 3 | symbol 4 | symbol 5 | symbol 6 | symbol 7 |
| clock cycle N | TC.SOF | PDU | EOF | CRC | FLR | FLR | FLR | FLR |
| clock cycle N+1 | TC.SOF | PDU | EOF | CRC | FLR | FLR | FLR | FLR |
| clock cycle N+2 | TC.SOF | PDU | EOF | CRC | FLR | FLR | FLR | FLR |
| clock cycle N+3 | TC.SOF | PDU | PDU | FLR | FLR | FLR | FLR | FLR |

METHOD FOR DATA PROCESSING OF AN INTERCONNECTION PROTOCOL TO SUPPORT MULTIPLE LANES, CONTROLLER, AND STORAGE DEVICE

CROSS-REFERENCE TO RELATED APPLICATION

The present application claims priority under 35 U.S.C. § 119(a) to Taiwanese Patent Application No. 110133525 filed on Sep. 9, 2021, in the Taiwan Intellectual Property Office, which is incorporated herein by reference in its entirety.

BACKGROUND OF THE INVENTION

1. Field of the Invention

The present disclosure relates to an electronic device, and in particular to a method for data processing of an interconnection protocol, a controller and a storage device.

2. Description of the Related Art

Because the quantity of data produced and processed in current mobile devices (e.g., smartphones, tablets, multimedia devices, wearable devices and other computing devices) is continuously increasing, the interconnection interface technology of the chip to chip inside the mobile devices or affected by the mobile devices needs to further evolve to meet higher transmission speeds, low power operation, scalability, support for multitasking, easy adoption and other goals.

To achieve the above objectives, the Mobile Industry Processor Interface (MIPI) alliance has developed interconnection interface technologies that meet these goals, such as the MIPI M-PHY specification for the physical layer and the MIPI UniPro specification for the Unified Protocol (UniPro). On the other hand, the Joint Electronic Device Engineering Council (JEDEC) introduced the next generation of high-performance non-volatile memory standards, known as Universal Flash Storage (UFS), using the MIPI M-PHY specification and the unified protocol MIPI UniPro specification. This enables high-speed transmission at one billion bits per second and low-power operation, and provides the functionality and scalability required for high-end mobile systems, thus facilitating rapid adaption by the industry.

Technicians should ensure that the function and operation of the products are in compliance with the specifications when they develop the products related to chips, electronic modules or electronic devices according to these interconnection interface technologies. For example, as to systems implemented according to UFS standards, such as comprising a computing device and a non-volatile memory storage device, the computing device and the storage device respectively play the role of local host and remote device. According to the UniPro specification, a two-way link is established between the host and the remote device, and the link between the host and the remote device can be configured as multiple (at most four) lanes in either transmission direction. Correspondingly, when the host and the device are implemented according to the interconnection protocol of the UniPro specification, the host and the remote device each configure the processing circuit of the interconnection protocol, which must support the function of multiple lanes. Furthermore, under the application scenario of four lanes, the corresponding circuit of the data link layer in the processing circuit of the interconnection protocol needs to be able to handle the error control of four frames simultaneously in each clock cycle, and needs to respond to the complex situation of the interaction effect of various possible errors. Thus, when the quantity of lanes supported is large, the complexity of the processing circuit of the interconnection protocol becomes high. Further, when a wider bus width of the lane needs to be implemented, the complexity of the processing circuit of the interconnection protocol becomes high.

Since the UniPro specification is basically implemented by hardware circuits, when the requirements of different products need to implement multiple lanes based on the UniPro specification, the design of high-complexity hardware circuitry needs to be conducted, resulting in the difficulty of research and development, verification, and maintenance.

BRIEF SUMMARY OF THE INVENTION

The implementing method provides a technology for data processing of an interconnection protocol, wherein in processing of frame sending by the first device to the second device: allocating a plurality of start-of-frame (SOF)-included protocol data units (PDUs) to a designated lane among a plurality of active lanes of the first device, and configuring a PDU distance among the plurality of start-of-frame (SOF)-included protocol data units to be greater than or equal to a product of a maximum bus width of a lane of the interconnection protocol and a quantity of the plurality of active lanes. Accordingly, this can help greatly reduce the complexity of the hardware protocol engine implemented under the interconnection protocol.

Based on the technology, various implementing methods are proposed, such as an information configuration method for power mode change of an interconnection protocol, the controller, and the storage device.

The implementing method provides a method for data processing of an interconnection protocol, for use in a first device that is linkable to a second device according to the interconnection protocol, the method comprising: in processing of frame sending by the first device to the second device: allocating a first start protocol data unit (PDU) among a plurality of start-of-frame (SOF)-included protocol data units (PDUs) to a designated lane among a plurality of active lanes of the first device by a hardware protocol engine of the first device, the hardware protocol engine implementing the interconnection protocol; and by the hardware protocol engine, allocating a second start PDU among the plurality of SOF-included PDUs to the designated lane and rendering a PDU distance between the first start PDU and the second start PDU to be greater than or equal to a product of a maximum bus width of a lane of the interconnection protocol and a quantity of the plurality of active lanes.

The implementing method provides a storage device, operable to link to a host according to an interconnection protocol, the storage device comprising: an interface circuit and a device controller. The interface circuit is configured to implement a physical layer of the interconnection protocol so as to link to the host. The device controller is configured to be coupled to the interface circuit and a storage module, the device controller comprising a hardware protocol engine. The hardware protocol engine is configured to implement the interconnection protocol. In processing of frame sending by the storage device to the host, the hardware protocol engine performs a plurality of operations, the plurality of operations including: the hardware protocol engine allocating a first start protocol data unit (PDU)

among a plurality of start-of-frame (SOF)-included protocol data units (PDUs) to a designated lane among a plurality of active lanes of the storage device; and the hardware protocol engine allocating a second start PDU among the plurality of SOF-included PDUs to the designated lane and rendering a PDU distance between the first start PDU and the second start PDU to be greater than or equal to a product of a maximum bus width of a lane of the interconnection protocol and a quantity of the plurality of active lanes.

The implementing method provides a controller for use in a first device that is linkable to a second device according to an interconnection protocol, the controller comprising: an interface circuit, configured to implement a physical layer of the interconnection protocol so as to link to the second device; and a controller module, configured to be coupled to the interface circuit and to implement the interconnection protocol, in processing of frame sending by the first device to the second device. The controller module performs a plurality of operations, the plurality of operations including: allocating a first start protocol data unit (PDU) among a plurality of start-of-frame (SOF)-included protocol data units (PDUs) to a designated lane among a plurality of active lanes of the first device; and allocating a second start PDU among the plurality of SOF-included PDUs to the designated lane and rendering a PDU distance between the first start PDU and the second start PDU to be greater than or equal to a product of a maximum bus width of a lane of the interconnection protocol and a quantity of the plurality of active lanes.

In some embodiments of the above method, controller or storage device, the first start PDU and the second start PDU that are allocated each correspond to their respective clock cycles of a clock signal of the hardware protocol engine; and in the respective clock cycle, there is at most one SOF-included PDU allocated to the designated lane among the plurality of active lanes for sending.

In some embodiments of the above method, controller or storage device, the plurality of SOF-included PDUs correspond to a plurality of data frames of a data link layer in the hardware protocol engine.

In some embodiments of the above method, controller or storage device, the interconnection protocol is a Universal Flash Storage (UFS) standard.

As mentioned above, there are a plurality of implementations for data processing of an interconnection protocol. Accordingly, it can help greatly reduce the complexity of the hardware protocol engine implemented under the interconnection protocol, especially the complexity of the decoder in the data link layer receiver, thus reducing the difficulty of research and development, verification and maintenance.

BRIEF DESCRIPTION OF THE DRAWINGS

FIG. 5 is a schematic view of a format of the data frame for the data link layer according to the UniPro standard.

FIG. 6 is a schematic view of an embodiment of conducting the lane allocation at the sending end according to the method of FIG. 2.

FIG. 8B is a schematic view of another embodiment of implementing the architecture of the decoder of the data link layer receiver according to the method of FIG. 2.

FIG. 10 is a schematic view of another embodiment of conducting the lane allocation at the sending end according to the method of FIG. 2.

FIG. 11 is a schematic view of a first embodiment of the data processing of the decoder of the data link layer receiver at the receiving end when the sending end conducts the lane allocation according to FIG. 10.

FIG. 12 is a schematic view of a second embodiment of the data processing of the decoder of the data link layer receiver at the receiving end when the sending end conducts the lane allocation according to FIG. 10.

FIG. 13A is a schematic view of a third embodiment of the data processing of the decoder of the data link layer receiver at the receiving end when the sending end conducts the lane allocation according to FIG. 10.

FIG. 15 is a schematic view of an embodiment that the bus widths of the lanes inside the sending end and the receiving end are not the same.

FIG. 16 is a schematic view of an embodiment of conducting the lane allocation at the sending end and the data processing of the decoder of the data link layer receiver at the receiving end according to the method of FIG. 2, wherein the bus widths of the lanes inside the sending end and the receiving end are not the same.

DETAILED DESCRIPTION OF THE INVENTION

To facilitate understanding of the objectives, characteristics and effects of this present disclosure, embodiments together with the attached drawings for the detailed description of the present disclosure are provided.

The following implementing method provides a variety of embodiments of a technology for data processing of an interconnection protocol, wherein in processing of frame sending by the first device to the second device: allocating a plurality of start-of-frame (SOF)-included protocol data units (PDUs) to a designated lane among a plurality of active lanes of the first lane, and configuring a PDU distance among the plurality of start-of-frame (SOF)-included protocol data units (PDUs) to be greater than or equal to a product of a maximum bus width of a lane of the interconnection protocol and a quantity of the plurality of active lanes. Accordingly, it can help greatly reduce the complexity of the hardware protocol engine implemented under the interconnection protocol, especially the complexity of the decoder in the data link layer receiver, thus reducing the difficulty of research and development, verification and maintenance.

Figure 1:
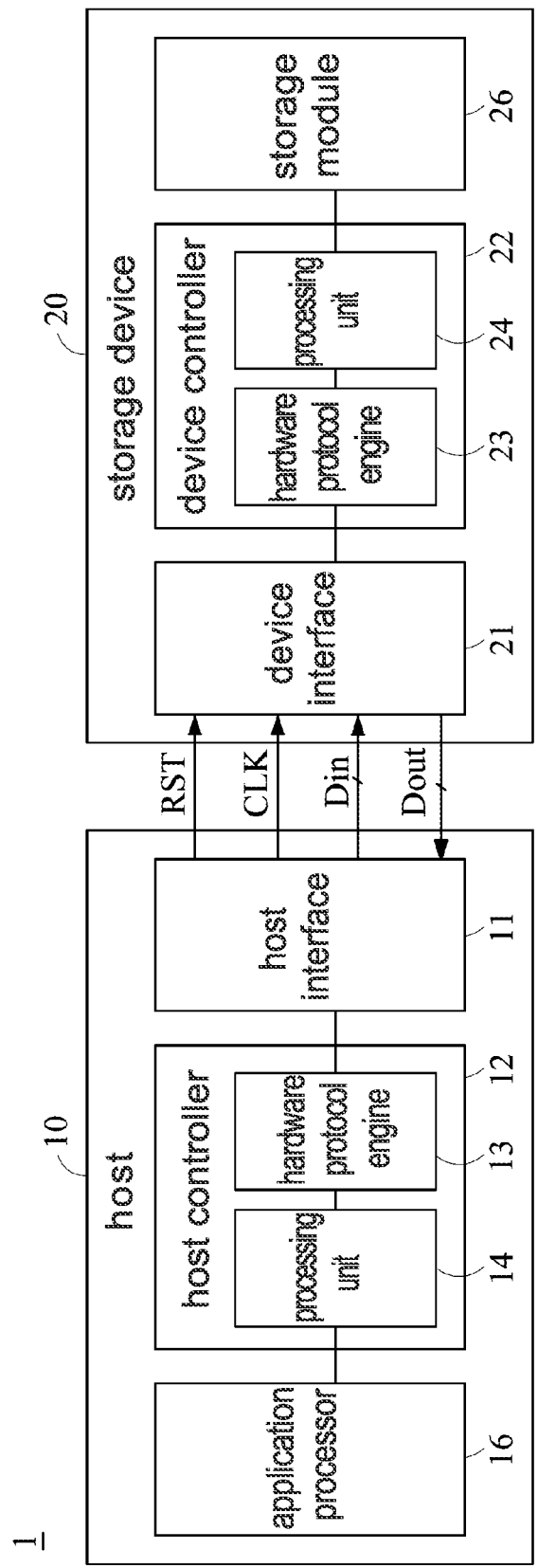
FIG. 1 is a schematic block diagram of a storage system according to an embodiment of the present disclosure.

For the convenience of understanding and illustration, first, an implementation of circuit architecture is provided according to the technology, the circuit architecture is flexible enough and can be efficiently configured to meet the specific needs of different product manufacturers, to adapt to the design of various manufacturers and contribute to product development. As shown in FIG. 1, when the circuit architecture is applied to the storage system 1, the controller module (e.g., host controller 12) of the host 10 of the storage system 1 or the controller module (e.g., device controller 22) of the storage device 20 of the storage system 1 can be respectively implemented as a circuit architecture including a hardware protocol engine and a processing unit, wherein the processing unit of the controller is optional. The method of the technology for data processing of an interconnection protocol will also be disclosed in FIG. 2.

Referring to FIG. 1, FIG. 1 is a schematic block diagram of a storage system according to an embodiment of the present disclosure. As shown in FIG. 1, the storage system 1 comprises a host 10 and a storage device 20. The host 10 and storage device 20 communicate through an interconnection protocol, thus allowing the host 10 access data to the storage device 20. The interconnection protocol is, for example, a Universal Flash Storage (UFS) standard. The host 10 is a computing device, for example, a smartphone, tablet, multimedia device. The storage device 20 is, for example, a storage device inside or outside the computing device, such as a storage device based on non-volatile memory. The storage device 20 can write data under the control of the host 10 or provide written data to the host 10. The storage device 20 may be implemented as a solid-state storage device (SSD), multimedia card (MMC), embedded MMC (eMMC), secure digital (SD) card or Universal Flash Storage (UFS) device, however, the implementation of the present disclosure is not limited to the above examples.

The host 10 comprises a host interface 11, a host controller 12 and an application processor 16.

The host interface 11 is configured to implement a physical layer of the interconnection protocol so as to link to the storage device 20. For example, the host interface 11 is configured to implement the physical (M-PHY) layer of the UFS standard.

The host controller 12 is coupled between the host interface 11 and the application processor 16. When the application processor 16 needs to access data to the storage device 20, it issues a corresponding access action instruction to the host controller 12, and communicates with the storage device 20 through the interconnection protocol, so as to achieve accessing data to the storage device 20.

The host controller 12 comprises a hardware protocol engine 13 and a processing unit 14, wherein the processing unit 14 is optional.

The hardware protocol engine 13 is configured to implement a link layer for the interconnection protocol. Taking the interconnection protocol as a UFS standard for example, the link layer is a Unified Protocol (UniPro) layer. The hardware protocol engine 13 communicates and conducts information conversion with the host interface 11 and the processing unit 14 according to the specification of the link layer.

The processing unit 14 is coupled to the hardware protocol engine 13, configured to communicate with the application processor 16. The processing unit 14 may comprise one or more firmware components. For example, access action instructions that are issued by the operating system, driver or applications performed by the application processor 16 are converted to an instruction format of the link layer that conforms to the interconnection protocol through the firmware performed by the processing unit 14, and then sent to the hardware protocol engine 13 for processing according to the specification of the link layer. The firmware is, for example, an internal memory that can be stored in the processing unit 14, or an internal memory that is stored in the host controller 12, wherein the internal memory may comprise volatile memory and non-volatile memory.

The storage device 20 comprises a device interface 21, a device controller 22 and a storage module 26.

The device interface 21 is configured to implement a physical layer of the interconnection protocol so as to link to the host 10. For example, the host interface 21 is configured to implement the physical (M-PHY) layer of the UFS standard.

The device controller 22 is coupled between the device interface 21 and the storage module 26. The device controller 22 may control a write operation, read operation or erase operation of the storage module 26. The device controller 22 may exchange data with the storage module 26 through an address bus or data bus. The storage module 26 is, for example, a memory chip comprising one or more non-volatile memory components.

The device controller 22 comprises a hardware protocol engine 23 and a processing unit 24, wherein the processing unit 24 is optional.

The hardware protocol engine 23 is configured to implement a link layer for the interconnection protocol. Taking the interconnection protocol as a UFS standard for example, the link layer is a UniPro layer. The hardware protocol engine 23 communicates and conducts information conversion with the device interface 21 and the processing unit 24 according to the specification of the link layer.

The processing unit 24 is coupled to the hardware protocol engine 23, configured to communicate with the host 10 through the device interface 21. The processing unit 24 may comprise one or more firmware components. For example, the processing unit 24 utilizes one or more firmware components to control or indicate the write operation, read operation or erase operation of the storage module 26, processes messages from the hardware protocol engine 23, or sends messages to the hardware protocol engine 23. The firmware is, for example, an internal memory that can be stored in the processing unit 24, an internal memory that is stored in the device controller 22, or stored in a specific storage area of the storage module 26, wherein the internal memory may comprise volatile memory and non-volatile memory.

As shown in FIG. 1, the host interface 11 may be coupled to the device interface 21 through the data lines Din and Dout used to send/receive data, the reset line RST used to send hardware reset signals, and the clock line CLK used to send data. The data lines Din and Dout may be implemented as multiple pairs, and one pair of data lines Din or Dout can be called a lane. The host interface 11 may communicate with the device interface 21 by using at least one interface protocol, such as Mobile Industry Processor Interface (MIPI), Universal Flash Storage (UFS), Small Computer System Interface (SCSI) or Serial Attached SCSI (SAS), but the implementation of the disclosure is not limited to the above examples. Under the UFS standard, the host 10 and the storage device 20 therebetween may be configured to support multiple lanes to improve transmission efficiency, wherein in either direction of the host 10 to the storage device 20 therebetween or the storage device 20 to the host 10 therebetween, the current UFS standard can at most support two lanes, multiple lanes can be chosen and set to be active or inactive. For example, in the UFS standard, from the MIPI M-PHY v4.x specification, the maximum of the data width from the M-PHY to the PA layer is 32 bits for one lane and 64 bits for two lanes.

Figure 2:
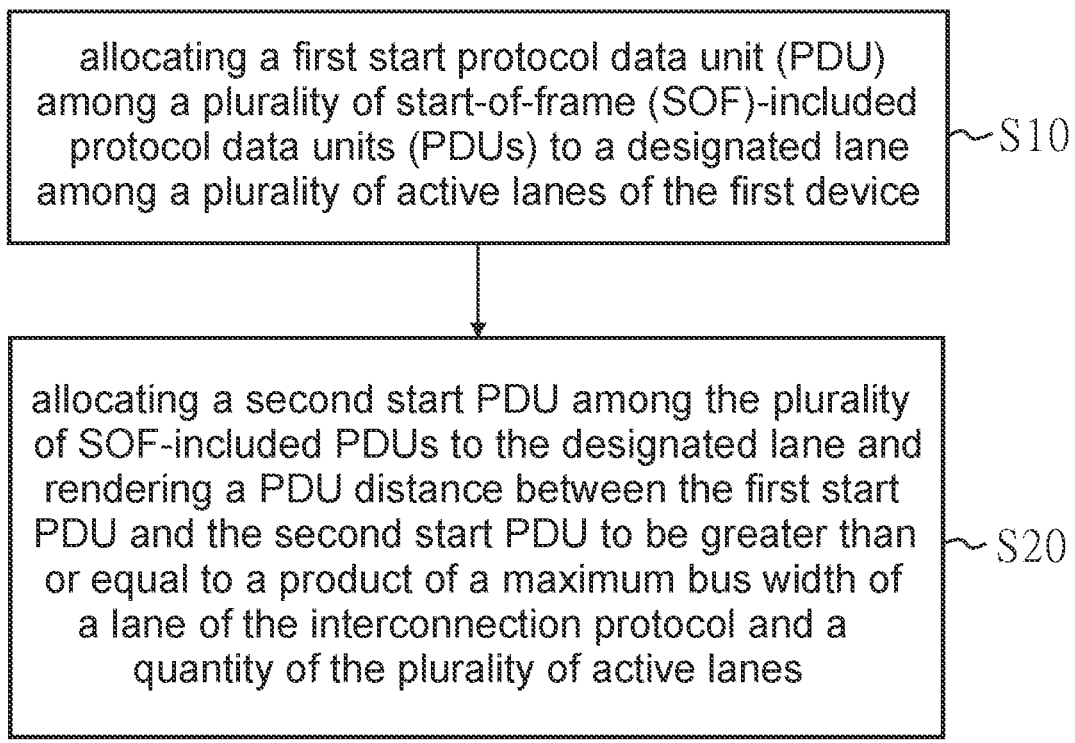
FIG. 2 is a flow chart of the method for data processing of an interconnection protocol according to an embodiment.

Controllers as shown in FIG. 1 (e.g., host controller 12 or device controller 22) may be respectively implemented as circuit architectures that comprise a hardware protocol engine and a processing unit, and the following examples illustrate implementing a method for data processing of an interconnection protocol. Referring to FIG. 2, FIG. 2 is a flow chart of the method for data processing of an interconnection protocol according to an embodiment. The method can be used in a first device (e.g., storage device 20) that is linkable to a second device (e.g., host 10) according to the interconnection protocol. For the convenience of illustration, the following is an example of a storage device 20 for the first device and a host 10 for the second device. As shown in FIG. 2A, the method comprises steps S10 to S20. The steps are performed in a hardware protocol engine (e.g., hardware protocol engine 23) of a link layer of the first device (e.g., storage device 20) according to the link layer of the interconnection protocol, the link layer implementing the interconnection protocol, in processing of frame sending by the first device to the second device.

Shown in step S10, allocating a first start protocol data unit (PDU) among a plurality of start-of-frame (SOF)-included protocol data units (PDUs) to a designated lane among a plurality of active lanes of the first device by a hardware protocol engine of a link layer of the first device, the link layer implementing the interconnection protocol.

Shown in step S20, by the hardware protocol engine, allocating a second start PDU among the plurality of SOF-included PDUs to the designated lane and rendering a PDU distance between the first start PDU and the second start PDU to be greater than or equal to a product of a maximum bus width of a lane of the interconnection protocol and a quantity of the plurality of active lanes.

In some embodiments, the first start PDU and the second start PDU that are allocated each correspond to their respective clock cycles of a clock signal of the hardware protocol engine; and in the respective clock cycle, there is at most one SOF-included PDU allocated to the designated lane among the plurality of active lanes for sending.

In some embodiments, the plurality of SOF-included PDUs correspond to a plurality of frames of a data link layer in the hardware protocol engine (e.g., data frame as shown in FIG. 5), and the clock signal is used for synchronization of the active lanes in a physical adapter layer (PA) in the hardware protocol engine.

The implementing method for the above steps is further illustrated as below.

As to step S10 and step S20, taking the interconnection protocol as a UFS standard, for example, the link layer in the UFS standard is defined by the UniPro layer, and in the case of multiple lanes being active, the lane allocation method recommended by the UniPro specification is to synchronously send the protocol data unit (PDU) of a frame through multiple lanes. In order to improve the data throughput, in some embodiments, the present invention discloses that M-PHY can be further implemented as 64 bits for one lane according to the UFS standard, and the quantity of lanes allowed by the UFS standard can be increased to more than 2, such as allowing the utilization of implementing 3 or 4 lanes, which is a practical way to exceed the limitation of the M-PHY specification in the current UFS standard. Therefore, in the case of the four lanes that extend from the current UFS standard being active, if the lane allocation method recommended by the UniPro specification is followed, the data link layer transmitter (or an acronym referred to as DL TX) at the sending end (e.g., host 10) may occur when there are four start-of-frame (SOF)-included protocol data units in a clock cycle sent at the same time, it correspondingly causes that the decoder of the data link layer receiver (or an acronym referred to as DL RX) at the receiving end (e.g., storage device 20) needs to have the ability to handle four frame errors simultaneously in a clock cycle, and needs to have various combinations of error handling methods when finding errors in different lanes. As a result, the complexity of the decoder of the data link layer receiver is relatively high and it is not conducive to implementation and verification. In contrast, the method of step S10 and step S20 in FIG. 2 allocates all start-of-frame (SOF)-included protocol data units to a designated lane (e.g., lane 0) among a plurality of active lanes at the sending end, then correspondingly, it only needs to implement the function of handling frame errors in the corresponding designated lane (e.g., lane 0) at the receiving end. As a result, detailed below, the method of FIG. 2 can help reduce the complexity of the decoder of the data link layer receiver. Therefore, in the implementation of the product, as long as the sending end and the receiving end (e.g., host 10 and storage device 20) are implemented by using the method of FIG. 2, the benefits of reducing complexity can be obtained.

In the embodiment of the above-mentioned method of FIG. 2, although the first device as the storage device 20 and the second device as the host 10 are illustrated, the method also applies to the first device as the host 10 and the second device as the storage device 20.

The following is a detailed description of taking the interconnection protocol as a Universal Flash Storage (UFS) standard as an example. The UFS standard comprises a UFS Command Set Layer (USC), a UFS Transport Layer (UTP) and a UFS Interconnect Layer (UIC). The UIC layer further comprises a Link Layer and a Physical Layer, the Link Layer of the UIC is defined according to the UniPro specification, and the Physical Layer of the UIC is defined according to the M-PHY specification.

Figure 3:
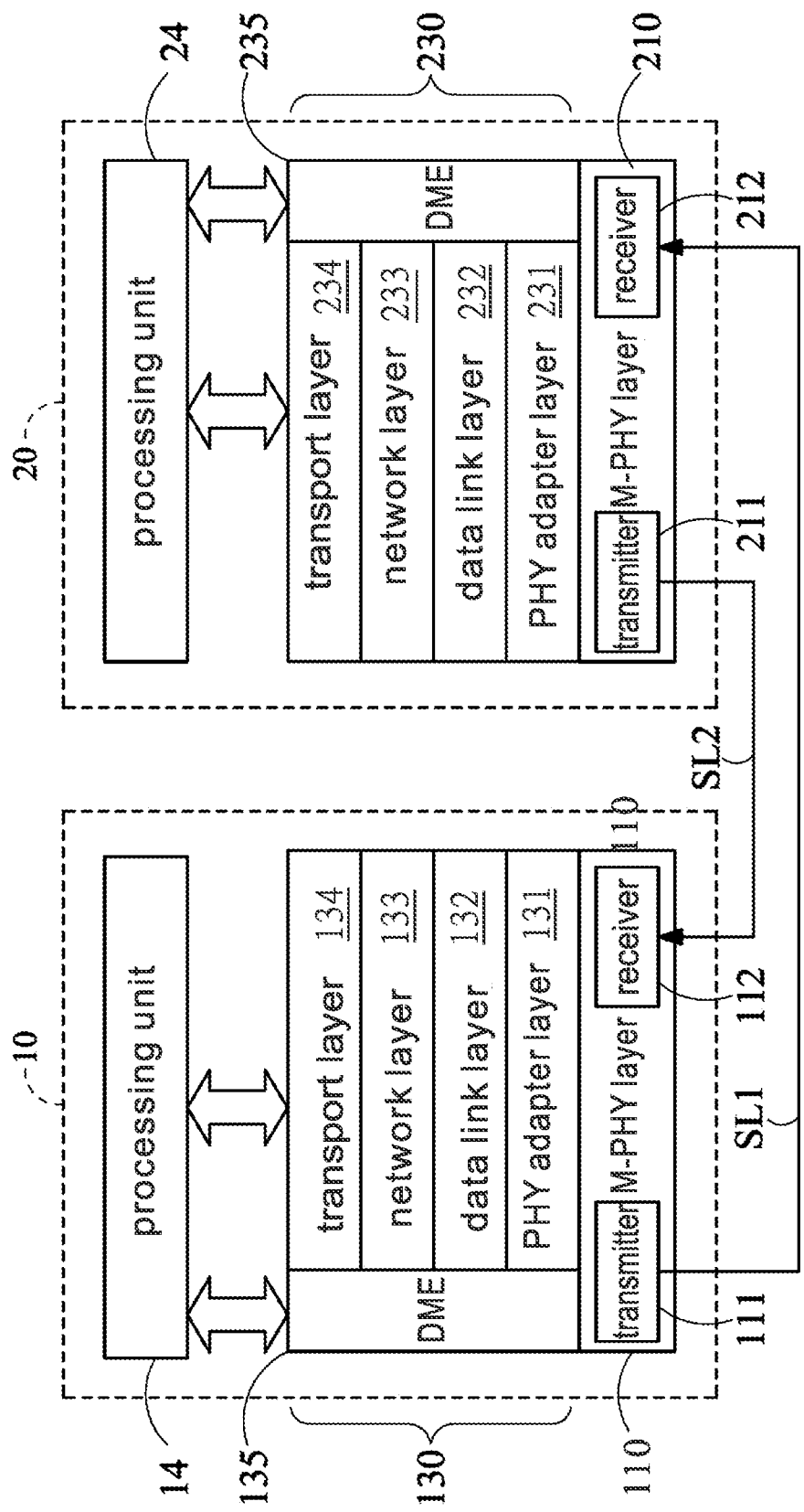
FIG. 3 is a schematic view of a layering framework of the storage system of FIG. 1 according to the UFS standard.

Referring to FIG. 3, FIG. 3 is a schematic view of a layering framework of the storage system of FIG. 1 according to the UFS standard. Since the UFS standard is based on the MIPI Unified Protocol (UniPro) layer and the MIPI physical (M-PHY) layer, the host interface 11 and the hardware protocol engine 13 of the host 10 shown in FIG. 1 are respectively used to implement a M-PHY layer 110 and a UniPro layer 130 in FIG. 3; the device interface 21 and the hardware protocol engine 23 of the storage device 20 shown in FIG. 1 are respectively used to implement a M-PHY layer 210 and a UniPro layer 230 in FIG. 3.

As shown in FIG. 3, the UniPro layer 130 (or 230) may comprises a PHY adapter layer (PA) 131 (or 231), a data link layer (DL) 132 (or 232), a network layer 133 (or 233) and a transport layer 134 (or 234). The various layers in the UniPro layer 230 of the storage device 20 may also operate and be implemented similarly.

The physical adapter layer (131 or 231) is used to couple the M-PHY layer (110 or 210) to the data link layer (132 or 232). The physical adapter layer (131 or 231) may perform bandwidth control, power management, and so on between the M-PHY layer (110 or 210) and the data link layer (132 or 232). In an embodiment, the M-PHY layer 110 of the host 10 comprises a transmitter 111 and a receiver 112, and the M-PHY layer 210 of the storage device 20 comprises a transmitter 211 and a receiver 212, thereby establishing data lanes SL1 and SL2 for full-duplex communication. The UniPro specification supports a plurality of data lanes for links in each transport direction, such as in a forward direction or in a reverse direction.

The data link layer (132 or 232) may perform flow control for data transmission between the host 10 and the storage device 20. That is, the data link layer (132 or 232) may monitor data transmission or control data transmission rate. In addition, the data link layer (132 or 232) may perform error control based on cyclic redundancy check (CRC). The data link layer (132 or 232) may use a packet received from the network layer (133 or 233) to generate a frame, or a packet may be generated by using a frame received from a physical adapter layer (131 or 231).

The network layer (133 or 233) is used to select the routing function of the transport path for packets received from the transport layer (134 or 234).

The transport layer (134 or 234) may use a command received from the UFS application layer to configure a segment that is appropriate for the protocol and send the segment to the network layer (133 or 233), or extract a command from packets received by the network layer (133 or 233) and send the command to the UFS application layer. The transport layer (134 or 234) can use sequence-based error control schemes to ensure the validity of data transmission.

Furthermore, the device management entity (DME) (135 or 235) is further defined in the UniPro layer (130 or 230), which can intercommunicate with layers in the M-PHY layer (110 or 210) and the UniPro layer (130 or 230), such as the physical adapter layer (131 or 231), the data link layer (132 or 232), the network layer (133 or 231) and the transport layer (134 or 234) and even the UFS application layer, thus implementing the control or function of configuration that involves functions of the Unified Protocol (UniPro), such as power on, shutdown, reset, power mode changes, etc.

Figure 4A:
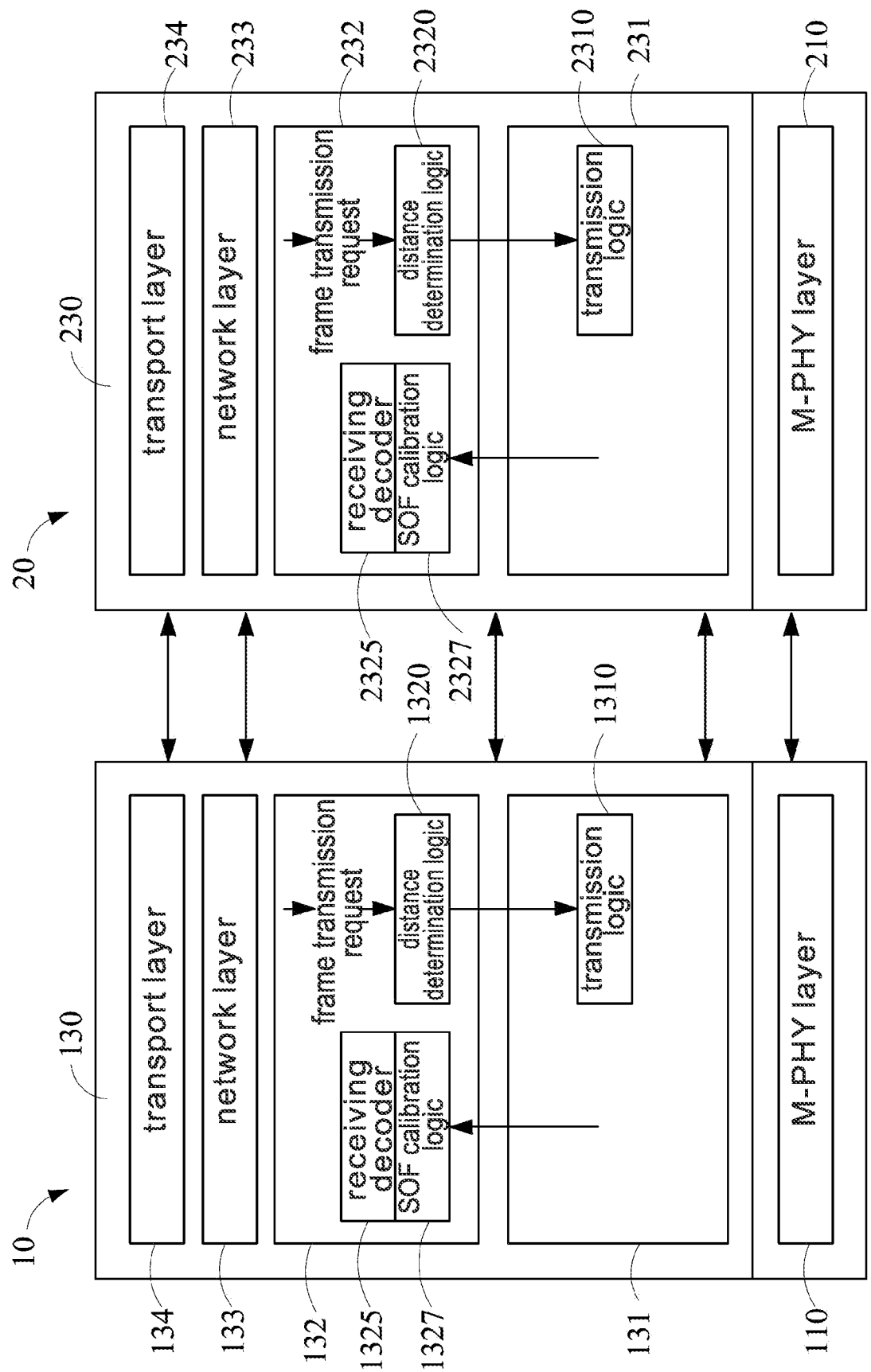
FIG. 4A is a schematic view of an embodiment of the circuit architecture of implementing the method of FIG. 2.

Referring to FIG. 4A, FIG. 4A is a schematic view of an embodiment of the circuit architecture of implementing the method of FIG. 2. As shown in FIG. 4A, the data link layer (132 or 232) and the physical adapter layer (131 or 231) can be implemented in the hardware protocol engines of the host and the storage device according to the method of FIG. 2.

For example, in an embodiment, the distance determination logic (1320 or 2320) is implemented in the data link layer (132 or 232), which can be used to calculate a protocol data unit distance (PDU distance) when processing the request for the frame transmission, or to judge and calculate the protocol data unit distance (PDU distance) among start-of-frame (SOF)-included protocol data units (PDUs), and to transmit information of the protocol data unit distance to the transmission logic (1310 or 2310) implemented in the physical adapter layer (131 or 231). The data link layer (132 or 232) and the physical adapter layer (131 or 231) use a designated lane (e.g., one of the four active lanes 0-4, such as lane 0) to transmit the start-of-frame (SOF)-included protocol data units (PDUs) according to step S10, and refer to the information from the distance determination logic (1320 or 2320) to render the start-of-frame (SOF)-included protocol data units (PDUs) thereamong to meet the condition of the protocol data unit distance required in step S20.

In addition, the above embodiment may only be implemented in the data link layer (132 or 232).

In some embodiments, a receiving decoder (1325 or 2325) and a start-of-frame (SOF) calibration logic (1327 or 2327) may be implemented correspondingly in the data link layer (132 or 232) to process the protocol data units (PDUs) from the physical adapter layer (131 or 231). The "logic" of FIG. 4A refers to functional modules that are implemented by using logic circuits, firmware circuits or hardware circuits.

Figure 4B:
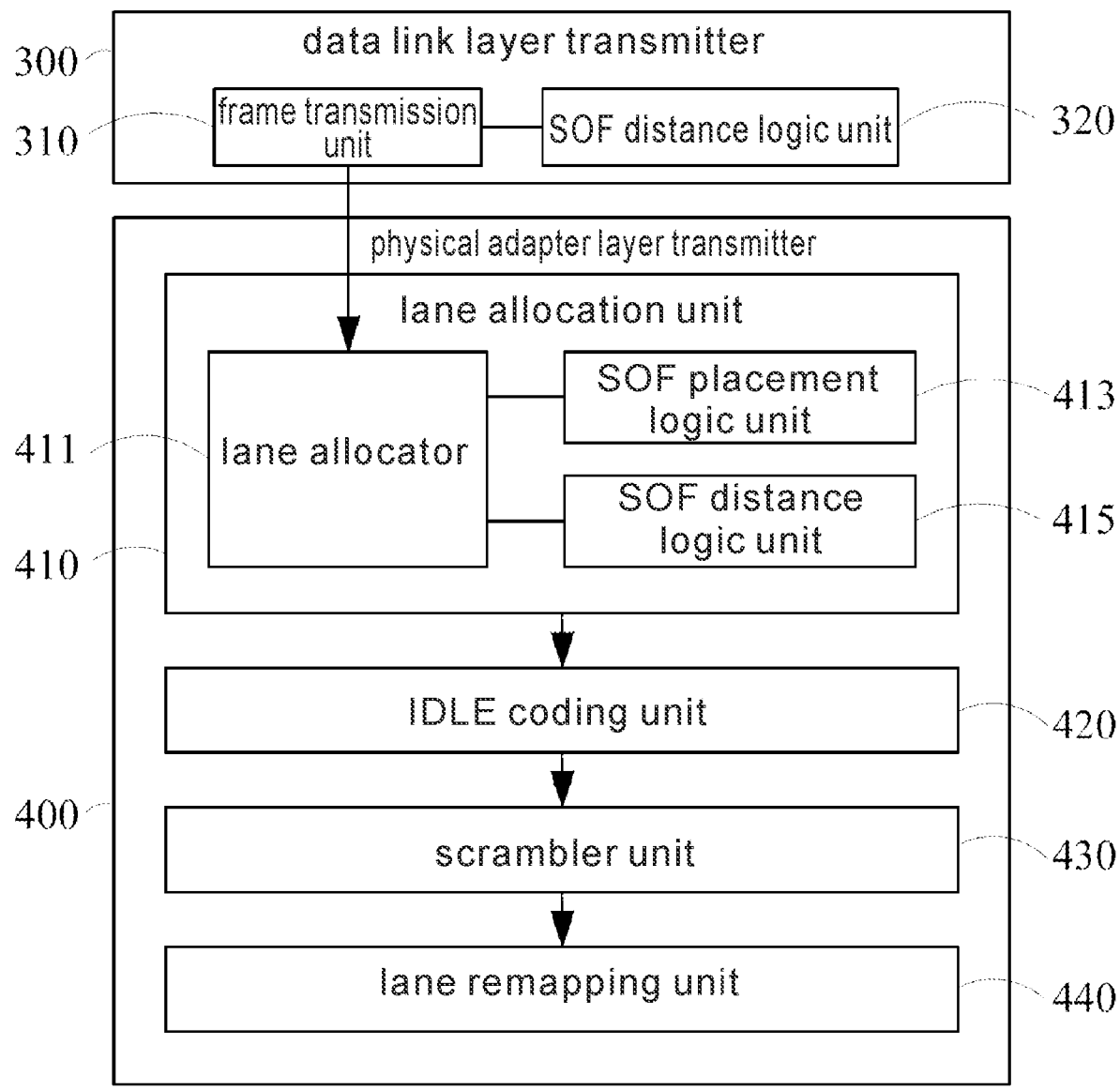
FIG. 4B is a schematic block diagram of an embodiment of the data link layer and the physical adapter layer in FIG. 4A.

Referring to FIG. 4B, FIG. 4B is a schematic block diagram of an embodiment of the data link layer and the physical adapter layer of FIG. 4A. To facilitate understanding of the implementation of the circuit architecture according to the method of FIG. 2, FIG. 4B only illustrates the embodiments of the transmitter of the data link layer (132 or 232 in FIG. 4A) and the corresponding transmitter of the physical adapter layer (131 or 231 in FIG. 4A). As shown in FIG. 4B, the method based on FIG. 2 is implemented by the data link layer transmitter 300 and the physical adapter layer transmitter 400. The controller of the host 10 and the controller of the storage device 20 in FIG. 1 may be implemented according to the UniPro specification and the data link layer transmitter 300 and the physical adapter layer transmitter 400 of FIG. 4B.

In FIG. 4B, the data link layer transmitter (or an acronym referred to as DL TX) 300 comprises a frame transmission unit 310 and a SOF distance logic unit 320. The frame transmission unit 310 may implement data frame transmission according to the UniPro specification. The SOF distance logic unit 320 corresponds to the distance determination logic (1320 or 2320) in FIG. 4A. In addition to being configurable to implement the data frame transmission according to the UniPro specification, the frame transmission unit 310 can be further configured according to the architecture as shown in FIG. 4B, and the SOF distance logic unit 320 is used to implement the method according to FIG. 2, a designated lane (e.g., lane 0) is used to transmit the start-of-frame (SOF)-included protocol data units (PDUs) according to step S10, and render the start-of-frame (SOF)-included protocol data units (PDUs) thereamong to meet the condition of the protocol data unit distance required in step S20.

In FIG. 4B, the physical adapter layer transmitter (or an acronym referred to as PA TX) 400 comprises a lane allocation unit 410, IDLE coding unit 420, scrambler unit 430 and lane remapping unit 440.

The lane allocation unit 410 is used to conduct lane allocation according to a plurality of protocol data units (PDUs) from the data frame of the data link layer transmitter 300. For example, the lane allocation unit 410 may be configured to receive a plurality of protocol data units (PDUs) from the data frame of the data link layer transmitter 300, convert it into a plurality of physical adapter layer protocol data units (or referred to as symbols) and allocate the plurality of protocol data units to a plurality of active lanes according to FIG. 2. The lane allocation unit 410 corresponds to the transmission logic (1310 or 2310) in FIG. 4A. For example, the lane allocation unit 410 can be configured to comprise a lane allocator 411, SOF placement logic unit 413 and SOF distance logic unit 415. In addition to being configurable to implement data frame transmission according to the UniPro specification, the lane allocator 411 may be further configured according to the architecture as shown in FIG. 4B, and the SOF placement logic unit 413 and the SOF distance logic unit 415 are used to implement the method according to FIG. 2, a designated lane (e.g., lane 0)

is used to transmit the start-of-frame (SOF)-included protocol data units (PDUs) according to step S10, and render the start-of-frame (SOF)-included protocol data units (PDUs) thereamong to meet the condition of the protocol data unit distance required in step S20.

In the embodiment of FIG. 4B, the lane allocation unit 410 allocates the plurality of received protocol data units to a plurality of active lanes, each lane needs a corresponding set of an IDLE coding unit 420, a scrambler unit 430 and a lane remapping unit 440, so as to process the symbol according to the UniPro specification, and then transmit the processed symbol to the physical (M-PHY) layer. For brevity, FIG. 4B shows only a set of an IDLE coding unit 420, a scrambler unit 430 and a lane remapping unit 440 required by a certain lane. For example, if four lanes are supported, four sets of the same units need to be implemented. The IDLE coding unit 420 can be configured to transmit the coding operation required by idle symbols (IDLE symbols) according to the requirement of the UniPro specification when there is no data to transmit, the scrambler unit 430 and the lane remapping unit 440 can respectively implement data processing operations of scrambling and lane remapping of the physical adapter layer according to the requirement of the UniPro specification. Because the IDLE coding unit 420, the scrambler unit 430, and the lane remapping unit 440 are based on the general implementation of the requirement of the UniPro specification, detailed description is omitted.

Figure 4C:
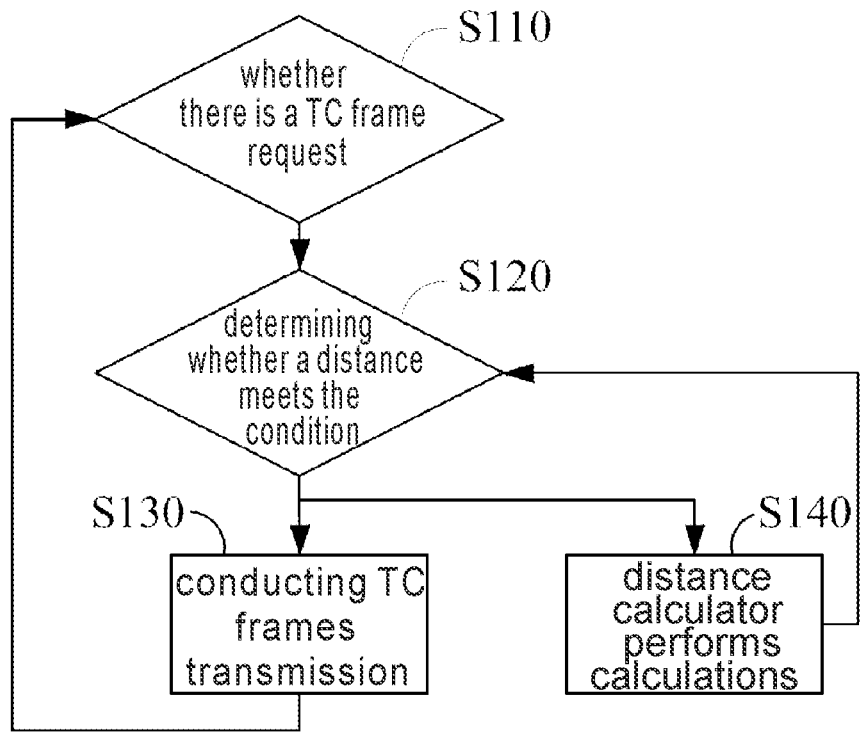
FIG. 4C is a schematic flow chart of an embodiment of the operation of the data link layer transmitter in FIG. 4B.

Referring to FIG. 4C, FIG. 4C is a schematic flow chart of an embodiment of the operation of the data link layer transmitter 300 in FIG. 4B. The data link layer transmitter 300 can be configured to use the frame transmission unit 310 and the SOF distance logic unit 320 to collaborate and implement data frame transmission, and to perform FIG. 4C to implement the method according to FIG. 2. For example, the frame transmission unit 310 is used to implement the data frame transmission; the SOF distance logic unit 320 is used to record, calculate or judge the distance among TC frames and inform the frame transmission unit 310.

The operation of FIG. 4C includes the following steps. As shown in step S110, the data link layer transmitter 300 (e.g., frame transmission unit 310) judges whether there is a TC frame request (e.g., frame transmission request). If step S110 judges that there is a TC frame request, step S120 is performed, otherwise step S110 is repeated. As shown in step S120, the frame transmission unit 310 determines whether a distance between two adjacent TC frames meets the condition of the protocol data unit distance required by the method of FIG. 2. If step S120 judges that the distance between the TC frames has met the condition of the protocol data unit distance, then steps S130 and S140 are performed, otherwise step S120 is repeated. As shown in step S130, the frame transmission unit 310 conducts TC frames transmission to transmit the TC frames to the lane allocation unit 410 of the physical adapter layer transmitter 400. As shown in step S140, a distance calculator performs calculations, such as the SOF distance logic unit 320 uses a counter as the distance calculator to further record and calculate the distance between the TC frames, and then repeats the step S120 until the distance between the TC frames meets the above condition. The operation of FIG. 4C can be repeatedly performed to transmit a plurality of TC frames to the physical adapter layer transmitter 400.

Figure 4D:
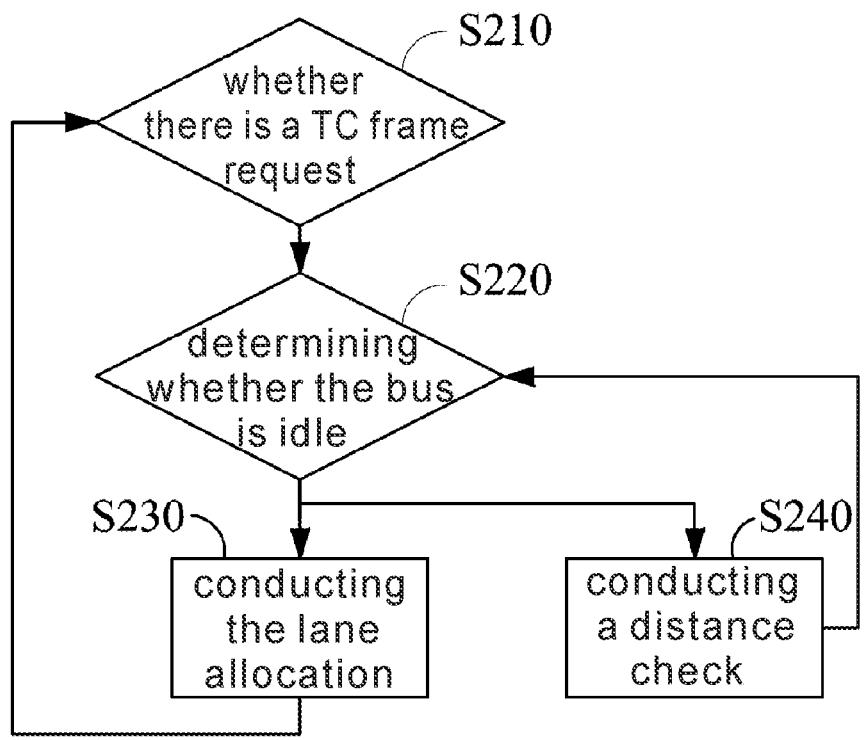
FIG. 4D is a schematic flow chart of an embodiment of the operation of the physical adapter layer transmitter in FIG. 4B.

Referring to FIG. 4D, FIG. 4D is a schematic flow chart of an embodiment of the operation of the physical adapter layer transmitter 400 in FIG. 4B. The physical adapter layer transmitter 400 can be configured to use the lane allocator 411, the SOF placement logic unit 413 and the SOF distance logic unit 415 of the lane allocation unit 410 to collaborate and implement data frame transmission, and to perform FIG. 4D to implement the method according to FIG. 2. For example, the lane allocation unit 410 is used to implement the lane allocation; the SOF placement logic unit 413 is used to implement judging start-of-frame (SOF)-included symbols and a position (such as a position of symbol 0, 1, 2 or 3) of the designated lane (e.g., lane 0), and inform the lane allocator 411 to place in the designated lane of the physical adapter layer; the SOF distance logic unit 415 is used to record, calculate or judge the distance among frames and inform the lane allocator 411.

The operation of FIG. 4D includes the following steps. As shown in step S210, the physical adapter layer transmitter 400 (e.g., lane allocation unit 410) judges whether there is a TC frame request (e.g., frame transmission request). If step S210 judges that there is a TC frame request, step S220 is performed, otherwise step S210 is repeated. As shown in step S220, the physical adapter layer transmitter 400 (e.g., lane allocation unit 410) determines whether the bus (e.g., active lane) is idle. If step S220 judges that the bus is idle, steps S230 and S240 are performed, otherwise step S220 is repeated. As shown in step S230, the lane allocation is conducted, for example, it is implemented by the lane allocator 411, the SOF placement logic unit 413 and the SOF distance logic unit 415. As shown in step S240, a distance check is conducted, for example, it is implemented by the SOF distance logic unit 415. The operation of FIG. 4D can be repeatedly performed to implement the lane allocation according to the method of FIG. 2.

Furthermore, in some embodiments, the SOF distance logic unit 320 (or SOF distance logic unit 415) can be configured to record and calculate a distance among the frames or the protocol data unit distance between the first start protocol data unit and a second start protocol data unit thereafter according to a first start-of-frame (SOF)-included protocol data unit placed in a position (e.g., position of symbol 0, 1, 2 or 3) of a designated lane (e.g., lane 0) in a certain clock cycle TO, a quantity of other active lanes (e.g., lane 1, 2, 3) (e.g., 3 lanes) and a quantity of clock cycles that pass after the clock cycle TO (e.g., pass 1 or 2 clock cycles). Accordingly, the frame transmission unit 310 and the SOF distance logic unit 320 collaborate and implement the method according to FIG. 2, so as to provide a lane allocation method other than the method recommended by the UniPro specification. The lane allocator 411, the SOF placement logic unit 413 and the SOF distance logic unit 415 collaborate and implement the method according to FIG. 2, so as to provide a lane allocation method other than the method recommended by the UniPro specification.

The following further explains an embodiment of the frame transmission and reception when the sending end is implemented according to the method of FIG. 2.

Referring to FIG. 5, FIG. 5 is a schematic view of a format of the data frame for the data link layer according to the UniPro standard. As shown in FIG. 5, when the data loaded by the payload (referred to as L2 payload) of the data frame is 0 bytes, the data frame comprises a minimum of four protocol data units (e.g., four 16-bit data), of which one protocol data unit includes a start-of-frame (SOF). In addition, the start-of-frame (SOF)-included protocol data unit may further comprise a traffic class mark, for example, TC0, TC1 to represent the priority level, and the data frame having the traffic class of TC0 or TC1 is referred to as an acronym of TCx frame in the UniPro specification, it can be called TC frame in the present disclosure. In addition, the ESC_DL mark represents the frame as a data link layer frame, the EOF_EVEN (or EOF_ODD) is a mark representing end of frame (EOF), and CRC-16 represents a cyclic redundancy check code. Thus, according to the format of the data frame in FIG. 5, a data frame comprises at least four protocol data units (PDUs). In FIG. 6 and the similar drawings, for example, four protocol data units (PDUs) included in a frame are represented by simplified notations TC.SOF, PDU, EOF and CRC. Certainly, the data loaded by payload load of the data frame may be greater than 0 bytes, so the data frame may comprise more than four protocol data units. In the actual application scenario, the data frame only having four protocol data units only accounts for a smaller amount of the overall transmission volume (e.g., less than 5%, such as about 1%), however, the data frame decoder needs to process this kind of frame according to the UniPro specification, so the following embodiment takes the frame only having four protocol data units as a processing object. As to the data frame comprising more than four protocol data units, it can also be applied.

Referring to FIG. 6, FIG. 6 is a schematic view of an embodiment of conducting the lane allocation at the sending end according to the method of FIG. 2. Shown as the upper part of FIG. 6, it indicates the frame transmission request to which the data link layer transmitter (DL TX) needs to respond, and there are four frames each having the same size of four protocol data units that need to be simultaneously transmitted to the receiving end under the same clock cycle (e.g., clock cycle N). In FIG. 6, lattices represent the protocol data unit of the frame, and the lattices are filled with different forms (e.g., no filling, sparsely distributed points, slashes, densely distributed points) to indicate different frames; the following similar pattern also represents the frame in a similar way, so detailed description is omitted. Shown as the lower part of FIG. 6, the data link layer transmitter (as indicated in DL TX) at the sending end can allocate four frames to four clock cycles (e.g., clock cycles N to N+3) for sending according to step S10 and step S20 of the method of FIG. 2. Correspondingly, the data link layer receiver at the receiving end may also only process one frame in a corresponding clock cycle, thus greatly reducing the complexity of the data link layer receiver.

Figure 7:
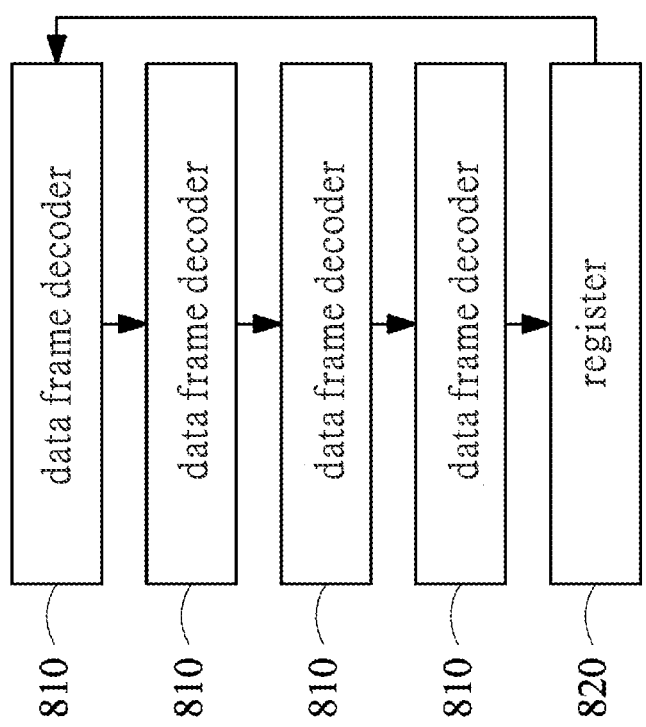
FIG. 7 is a schematic view of an embodiment of the architecture of the decoder of the data link layer receiver.

Referring to FIG. 7, FIG. 7 is a schematic view of an embodiment of the architecture of the decoder of the data link layer receiver at the receiving end. In the application scenario of the four lanes that extend from the current UFS standard, if the method of FIG. 2 is not used, that is, the data link layer receiver needs to implement four cascaded data frame decoders (as 1325 or 2325 shown in FIG. 4A) plus a register 820 as shown in FIG. 7, so as to implement processing at most four frames simultaneously in a clock cycle.

Figure 8A:
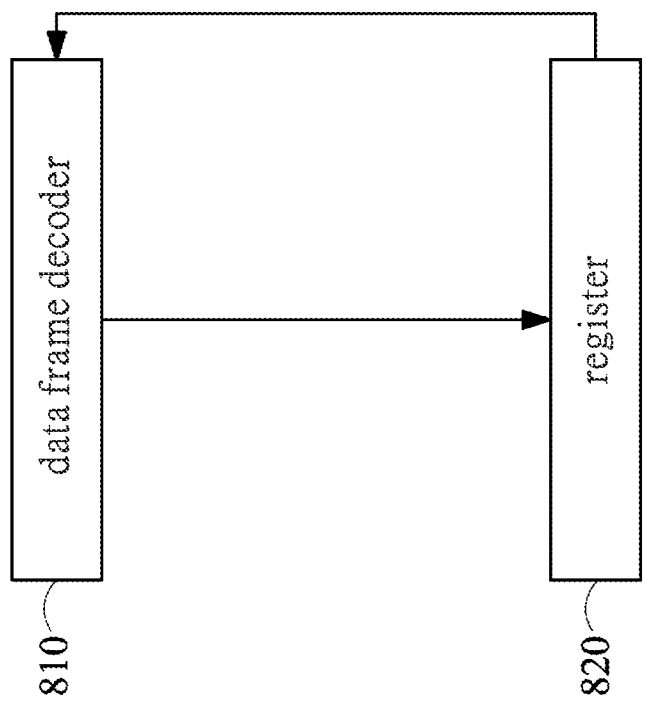
FIG. 8A is a schematic view of an embodiment of the architecture of the decoder of the data link layer receiver when implementing the sending end according to the method of FIG. 2.

Referring to FIG. 8A, FIG. 8A is a schematic view of an embodiment of the architecture of the decoder of the data link layer receiver at the receiving end when implementing the sending end according to the method of FIG. 2. In the application scenario of the four lanes that extend from the current UFS standard, according to the method of FIG. 2, the quantity of data frame decoders (as 1325 or 2325 shown in FIG. 4A) required by the data link layer receiver at the receiving end can be reduced to one, as shown in FIG. 8. It will greatly increase the implementation of hardware protocol engine at a high-rate clock (e.g., using ASIC or FPGA). Thus, compared to FIG. 7, the critical timing path of the register (OrphanFF) 820 in the embodiment of FIG. 8A is reduced by 75%; also, the complexity of implementing error handling in the embodiment of FIG. 8A is reduced. Most importantly, cascading error handling with high complexity is no longer required.

Referring to FIG. 8B, FIG. 8B is a schematic view of another embodiment of implementing the architecture of the decoder of the data link layer receiver according to the method of FIG. 2. The embodiment of FIG. 8B is similar to the embodiment of FIG. 8A in terms of the architecture of the decoder. Compared with FIG. 8A, the embodiment of FIG. 8B more specifically proposes the configuration of the registers 821, 822, 823, 824, which can be applied to a variety of situations of the frame transmission, such as the following multiple embodiments of FIGS. 11 to 15. Indeed, the implementation of the present disclosure is not limited by the embodiments.

Figure 9:
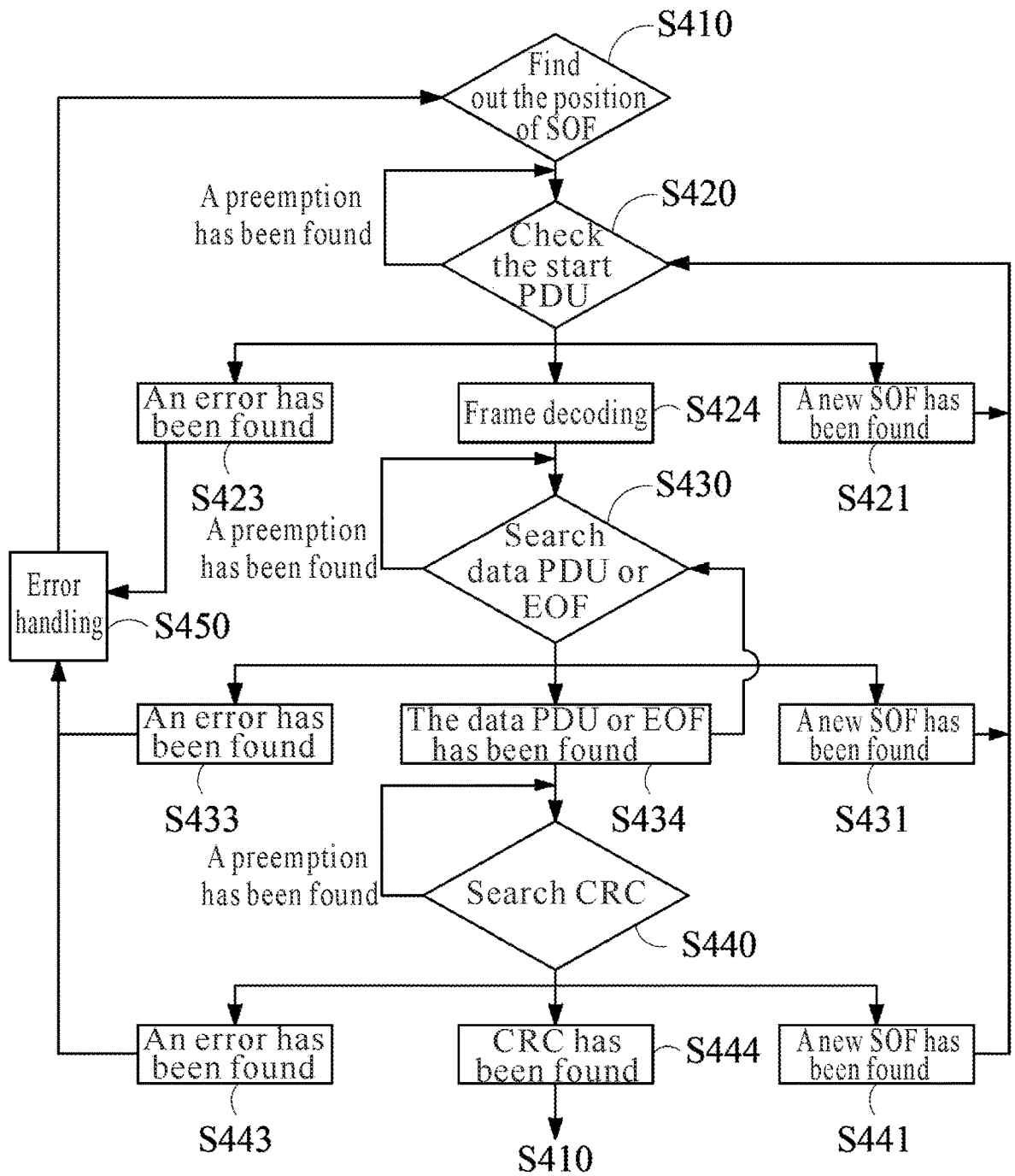
FIG. 9 is a schematic view of an embodiment of a decoder of the data link layer receiver.

Referring to FIG. 9, FIG. 9 is a schematic view of an embodiment of a decoder at the data link layer receiver. The decoder of the data link layer receiver (DL RX) operates on protocol management as follows:

Step S410: Find out the position of SOF. If step S410 finds SOP out, perform step S420.

Step S420: Check the start protocol data unit (head PDU), and check for "new SOFs", "preemptions" or "errors".

If step S420 judges that a "new SOF" has been found, it is an overlapping condition, then perform step S421 to report an error, and then perform step S420 again.

If step S420 judges that a "preemption" has been found, perform step S420 again.

If step S420 judges that an "error" has been found, perform step S423, step S450 for error handling, and then perform step S410.

If step S420 judges that none of the above situations ("new SOF", "preemption", "error") has occurred, then perform step S424 to conduct frame decoding and then enter step S430.

Step S430: Check and search data PDU or EOF, and check for "new SOFs", "preemptions" or "errors".

If step S430 judges that a "new SOF" has been found, it is an overlapping condition, then perform step S431 to report an error, and then perform step S420 again.

If step S430 judges that a "preemption" has been found, perform step S430 repeatedly.

If step S430 judges that an "error" has been found, perform step S433, step S450 for error handling, and then perform step S410.

If step S430 judges that the data PDU or EOF has been found, perform step S434. In step S434, the data PDU is stored, and then step S430 is performed; for EOF, EOF decoding is performed, and then step S440 is performed.

Step S440: Check and search CRC, and check for "new SOFs", "preemptions" or "errors".

If step S440 judges that a "new SOF" has been found, it is an overlapping condition, then perform step S441 to report an error, and then perform step S420 again.

If step S440 judges that a "preemption" has been found, perform step S440 repeatedly.

If step S440 judges that an "error" has been found, perform step S443, step S450 for error handling, and then perform step S410.

If step S440 judges that CRC has been found, perform step S444 for CRC and frame decoding, and then perform step S410.

The operation of FIG. 9 indicates the operation process of managing, preemption processing, and error handling for the protocol specified by UniPro. According to the UniPro specification, the decoder of the data link layer receiver (DL RX) determines for each protocol data unit (PDU) whether something is checked, such as whether the PDU indicates that a new information box is coming in, whether the PDU indicates a situation of preemption (i.e., the PDU is another frame, not the current processing frame), whether the PDU is SOF, EOF or CRC. The above checks need conducting error handling, reporting to the upper layer or peer, which can implement error handling according to the UniPro specification, so detailed description is omitted.

Figure 13B:
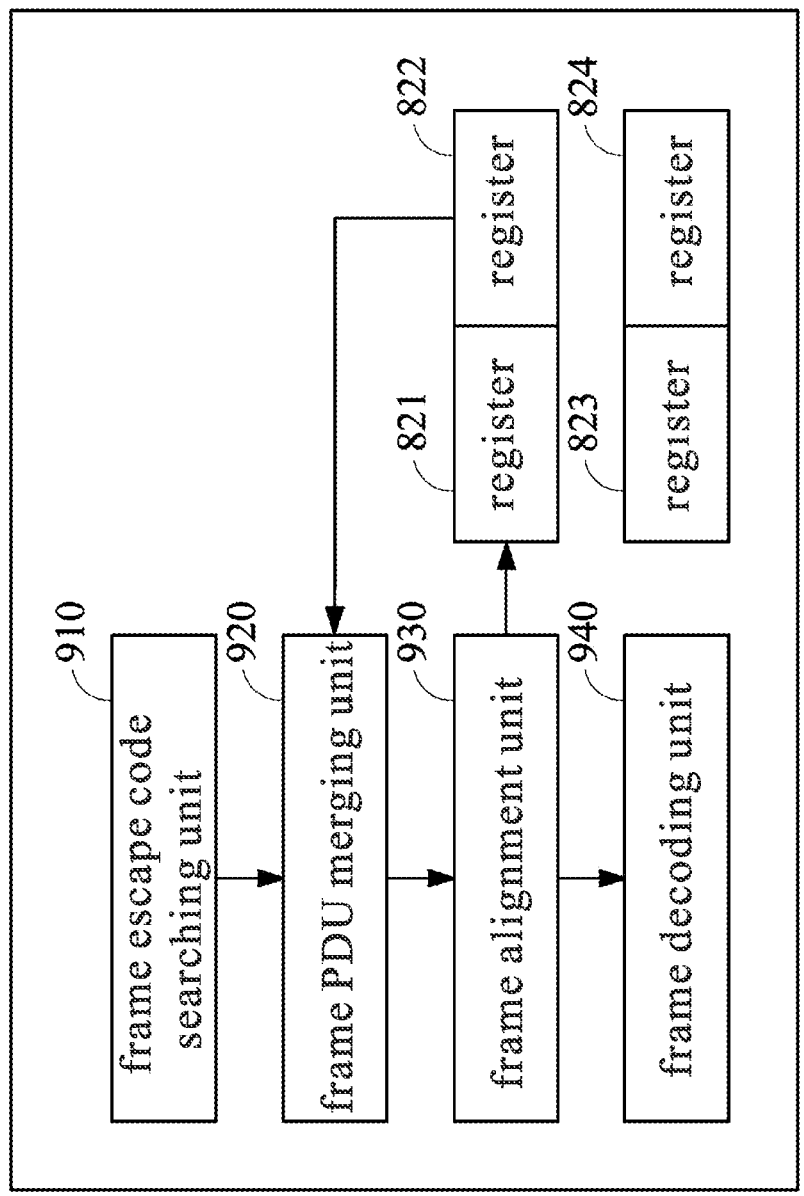
FIG. 13B is a schematic view of an embodiment of the circuit architecture of the decoder of the data link layer receiver of FIG. 9.

The operation of FIG. 9 can be applied in the decoders each of FIG. 7, FIG. 8A, and FIG. 8B. After the protocol management of FIG. 9 is used to verify that each PDU data is correct, data management in FIG. 13B is further conducted to facilitate subsequent operations to transmit data after decoding the data frame to the upper layer.

Thus, implementing the data link layer at the sending end according to the method of FIG. 2 can reduce the quantity of data frame decoders required by the data link layer receiver at the receiving end to one, as shown in FIG. 8A or FIG. 8B, so that it can surely help greatly reduce the complexity of the decoder of the data link layer receiver.

In the method of FIG. 2, there are at least two corresponding rules. The first rule (e.g., step S10, step S20) is to allocate a plurality of start-of-frame (SOF)-included protocol data units (PDUs) to a designated lane among a plurality of active lanes. The second rule (such as step S20) is to configure a PDU distance among the plurality of start-of-frame (SOF)-included protocol data units (PDUs) to be greater than or equal to a product of a maximum bus width of a lane of the interconnection protocol and a quantity of the plurality of active lanes. An example is described as follows.

In UniPro, DL TX operates on logical lanes (or referred to as lanes). For the first rule described above, FIG. 6 illustrates the impact of the rule. FIG. 6 shows a four-lane application scenario. According to the current UniPro specification, a sending end (or referred to as an initiator) can send four frames within a clock cycle. After applying the first rule, the four frames are allocated to four clock cycles, N to N+3. Assuming that the other party (receiving end or referred to as target) has the same Reference M-PHY Module Interface (RMMI) bus width, the decoder of the DL RX of the other party can only process one frame within a clock cycle. In FIG. 6, four lanes are used to illustrated, a plurality of filler symbols (FLR) are appropriately inserted in the corresponding logical lanes in the data link layer, so that the start-of-frame (SOF)-included protocol data units (e.g., represented by TC.SOF) therebetween meet the condition of protocol data unit distance required in step S20. For example, there are 16 protocol data units separated from the protocol data unit TC.SOF of the clock cycle N and the protocol data unit TC.SOF of the clock cycle N+1. The operation of the above filler symbol insertion, for example, can be implemented by the frame transmission unit 310 and the SOF distance logic unit 320 of FIG. 4B.

In UniPro, functions such as "preemption", "PHY Adapter Control Protocol (PACP) interleave", or "SKIP insertion" may affect the position for receiving the SOF. However, in the implementation of the method in FIG. 2, the SOF will be received in the designated lane, such as lane 0, and the decoder of the DL RX always processes one frame within a clock cycle.

Referring to FIG. 10, FIG. 10 is a schematic view of another embodiment of conducting the lane allocation at the sending end according to the method of FIG. 2. In FIG. 10, the operation of using two lanes and an RMMI bus with a width of 80 bits is illustrated, wherein the two lanes are indicated by lane 0 and lane 1.

In FIG. 10, two data frames are transmitted on the clock cycle N and the clock cycle N+1. After the protocol data unit is allocated according to the method of FIG. 2, the protocol data unit of the aforementioned data frame is allocated to lane 0 and lane 1 of the physical adapter layer transmitter (PA TX). Note that 80 bits are used in 8b/10b bypass mode. In a normal operating mode, only 64 bits are used.

As mentioned earlier, due to preemption, PACP interleave, or SKIP insertion, the other party (receiver (RX)) may have different SOF positions when receiving, there may be four reception scenarios that occur. Examples are described respectively as follows.

Referring to FIG. 11, FIG. 11 is a schematic view of a first embodiment of the data processing of the decoder of the data link layer receiver at the receiving end when the sending end conducts the lane allocation according to FIG. 10. In FIG. 11, the physical adapter layer receiver (PA RX) at the receiving end receives TC.SOF at lane 0 and the data link layer receiver (DL RX) at the receiving end receives TC.SOF at logical lane 0. The condition indicates that no positional offset on the protocol data unit occurred at the time of reception. As a result, the decoder of the DL RX can only process one frame within a clock cycle.

Referring to FIG. 12, FIG. 12 is a schematic view of a second embodiment of the data processing of the decoder of the data link layer receiver at the receiving end when the sending end conducts the lane allocation according to FIG. 10. Referring to FIG. 13A, FIG. 13A is a schematic view of a third embodiment of the data processing of the decoder of the data link layer receiver at the receiving end when the sending end conducts the lane allocation according to FIG. 10. FIG. 13B is a schematic view of an embodiment of the architecture of the decoder of the data link layer receiver at the receiving end, in response to the embodiments of FIGS. 11, 12 and 13A. The architecture shown in FIG. 13B is managed by the protocol of FIG. 9 to verify that the data of the PDU is correct, and the data is further managed, such as searching, merging and alignment.

Similar operations are performed in the second embodiment of FIG. 12 and the third embodiment of FIG. 13A. Since TC.SOF is not in the first position, as shown in FIG. 13B, the decoder of the DL RX can be aligned with the register 821 (or referred to as a register used for alignment (Alignment FF)) to make the SOF in the first position. As indicated by the frame indicated by the right arrow of FIG. 12 or 13A, the decoder of the DL RX can only process one frame within one clock cycle at the clock cycle N+1.

Referring to FIG. 13B, data management such as searching, merging, alignment, can use a frame escape code searching unit 910, a frame PDU merging unit 920, a frame alignment unit 930, a frame decoding unit 940 for implementing. The frame escape code searching unit 910 is used to conduct ESC_DL searching. The frame PDU merging unit 920 is used to merge the frame PDUs. The frame alignment unit 930 is used for frame alignment. The frame decoding unit 940 is used for frame decoding.

The operation of data management indicated by FIG. 13B is as follows, first, the frame escape code searching unit 910 is used to conduct ESC_DL searching, and then the frame PDU merging unit 920 is used to merge the subsequent PDUs. When part of the PDU of the frame crosses a clock cycle, the register 822 (or referred to as a register used for orphaned PDUs (Orphan FF)) is used. In the case of FIG. 12 or 13A, when the TC.SOF is not in the first position, the frame alignment unit 930 and the register 821 (Alignment FF) are used for alignment so that the SOF is in the first position. When the last PDU of the frame is received, the frame decoding unit 940 is used for frame decoding, and the information of the frame in the register 824 (or referred to as a register used for registering the information received by the frame (Information FF)) is updated, and reporting to the upper layer that one frame has been received.

Figure 14:
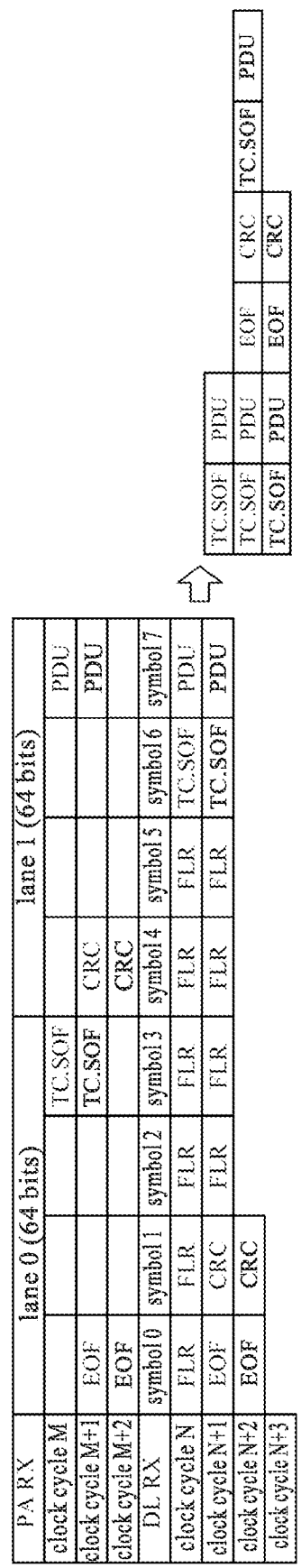
FIG. 14 is a schematic view of a fourth embodiment of the data processing of the decoder of the data link layer receiver at the receiving end when the sending end conducts the lane allocation according to FIG. 10.

Referring to FIG. 14, FIG. 14 is a schematic view of a fourth embodiment of the data processing of the decoder of the data link layer receiver at the receiving end when the sending end conducts the lane allocation according to FIG. 10. As shown in FIG. 14, in the clock cycle M, there is a TC.SOF of the frame at the fourth protocol data unit position in lane 0, and the other protocol data units of the frame are in lane 1 or in the clock cycle M+1; a similar situation is true of another frame. In the above case, in the operation of the decoder of the DL RX according to FIGS. 9 and 13B, the register 822 (Orphan FF) is required to store incomplete data frames (i.e., individual protocol data units in the frame) for the next clock cycle to conduct the frame decoding. In the clock cycle N+1, the decoder of the DL RX aligns the first frame. In the clock cycle N+2, the decoder of the DL RX decodes the first frame and places the incomplete second data frame in the register 823 (or referred to as a register used for fragmented PDUs (Fragment FF)). In the clock cycle N+2, the decoder of the DL RX aligns the second data frame and decodes it. Accordingly, the decoder of the DL RX can only process one frame within a clock cycle.

For the implementation of the first rule mentioned above, from the point of view of design and verification, under the application scenario of utilizing four lanes, taking lane 0 as the designated lane for example, there is no need to establish test cases for lane 1, lane 2, lane 3 with the SOF. Accordingly, the work of design and verification of the decoder of the DL RX can be reduced by approximately 75% under the use of four lanes.

The second rule (e.g., step S20) is to configure a PDU distance among the plurality of start-of-frame (SOF)-included protocol data units (PDUs) to be greater than or equal to a product of a maximum bus width of a lane of the interconnection protocol and a quantity of the plurality of active lanes (or referred to as distance rule).

In the M-PHY specification, the RMMI interface is defined. RMMI can be used as a communication interface between the M-PHY layer and the UniPro layer. Also, the width of the RMMI bus in draft M-PHY5.0 specification R03 can be set to 10, 20, 40 or 80 bits (i.e., corresponding to 1, 2, 4 or 8 parallel symbols). The above information about the M-PHY specification implies that the RMMI bus width between the two agents (e.g., the aforementioned host and device) may be of different sizes. If the distance rule is not used, the situation shown in FIG. 15 may occur.

As shown in FIG. 15, in the above case, the RMMI bus width at the initiator is 32 bits, of which 40 bits are used for 8b/10b bypass mode. On the other hand, the target has a 64-bit RMMI bus width. As a result, if the initiator fails to adopt the distance rule, PA RX receives two TC.SOFs of the frame in lane 0, shown as the clock cycles M and M+1 in FIG. 15. As a result, the decoder of the DL RX must be implemented to process two frames within a clock cycle. To resolve the issue, the distance rule based on the method in FIG. 2 is introduced as follows:

PDU Distance=Activate LANE number*Maximum RMMI Bus Width

Referring to FIG. 16, FIG. 16 is a schematic view of an embodiment of conducting the lane allocation at the sending end and the data processing of the decoder of the data link layer receiver at the receiving end according to the method of FIG. 2. In the embodiment of FIG. 16, the bus width of the lane at the sending end is 32 bits, and the bus width of the lane inside the receiving end is 64 bits. For example, regarding draft M-PHY5.0 specification R03, for 8b/10b bypass mode, the maximum bus width is 80 bits, the maximum bus width correspondingly and actually used in the transmission symbol is 64 bits. Therefore, in a two-lane configuration, the "protocol data unit distance" is set to 2*4 PDUs=8 PDU. As shown in FIG. 16, the TC.SOF is allocated to the 32-bit lane 0 of PA TX, and the "protocol data unit distance" between the two TC.SOFs is maintained at 8 PDUs at the sending side. As a result, the TC.SOF is transmitted to the 64-bit lane 0 of PA RX and the "protocol data unit distance" between the two TC.SOFs is satisfied to be 8 PDUs at the receiving end, thus allowing the TC.SOF to be transmitted to the logical lane 0 of the DL RX. Accordingly, the sending end is implemented according to the method of FIG. 2, because the first and second rules are met, even if the lane bus widths at the sending end and the receiving end are not the same, the result can also be obtained as shown in FIG. 16 so that the start-of-frame (SOF)-included protocol data units are transmitted by the designated lane, and there will not be a situation such as shown in FIG. 15. Indeed, in the embodiment of FIG. 15, if the receiving end is changed to a 32-bit or 16-bit lane, the start-of-frame (SOF)-included protocol data units can also be transmitted by the designated lane.

For example, the initiator can be inserted by a filler symbol (FLR) to meet the distance rule when needed, so that the corresponding DL RX decoder can be implemented to only process one frame within a clock cycle.

In addition, in the above embodiments for the host and the storage device, the hardware protocol engine in the host controller or device controller can be designed based on technologies of any other design method using a hardware description language (HDL) such as the Verilog language or digital circuit familiar to those skilled in the art, and can be implemented based on the use of a field programmable gate array (FPGA), or one or more circuits such as an application specific integrated circuit (ASIC) or a complex programmable logic device (CPLD), or can also be implemented by using proprietary circuits or modules. The host controller or device controller (or a processing unit or hardware protocol engine thereof) can also be implemented based on a microcontroller, processor, or digital signal processor.

As mentioned above, the above provides a technology for data processing of an interconnection protocol, and various implementing methods are proposed according to the technology of data processing, such as a method for data processing of an interconnection protocol, a controller, and a storage device. Accordingly, it can help greatly reduce the complexity of the hardware protocol engine implemented under the interconnection protocol, especially the complexity of the decoder in the data link layer, thus reducing the difficulty of research and development, verification and maintenance.

While the present disclosure has been described by means of specific embodiments, numerous modifications and variations could be made thereto by those skilled in the art without departing from the scope and spirit of the present disclosure set forth in the claims.

What is claimed is:

1. A method for data processing of an interconnection protocol, for use in a first device that is linkable to a second device according to the interconnection protocol, the method comprising:

in processing of frame sending by the first device to the second device:

allocating a first start protocol data unit (PDU) among a plurality of start-of-frame (SOF)-included protocol data units (PDUs) to a designated lane among a plurality of active lanes of the first device by a hardware protocol engine of the first device, the hardware protocol engine implementing the interconnection protocol; and by the hardware protocol engine, allocating a second start PDU among the plurality of SOF-included PDUs to the designated lane and rendering a PDU distance between the first start PDU and the second start PDU to be greater than or equal to a product of a maximum bus width of a lane of the interconnection protocol and a quantity of the plurality of active lanes.

2. The method of claim 1, wherein the first start PDU and the second start PDU that are allocated each correspond to their respective clock cycles of a clock signal of the hardware protocol engine; and in the respective clock cycle, there is at most one SOF-included PDU allocated to the designated lane among the plurality of active lanes for sending.

3. The method of claim 2, wherein the plurality of SOF-included PDUs correspond to a plurality of data frames of a data link layer in the hardware protocol engine.

4. The method of claim 1, wherein the interconnection protocol is a Universal Flash Storage (UFS) standard.

5. A controller for use in a first device that is linkable to a second device according to an interconnection protocol, the controller comprising:

an interface circuit, configured to implement a physical layer of the interconnection protocol so as to link to the second device; and a controller module, configured to be coupled to the interface circuit and to implement a link layer of the interconnection protocol, wherein in processing of frame sending by the first device to the second device, the controller module performs a plurality of operations, the plurality of operations including:

allocating a first start protocol data unit (PDU) among a plurality of start-of-frame (SOF)-included protocol data units (PDUs) to a designated lane among a plurality of active lanes of the first device; and allocating a second start PDU among the plurality of SOF-included PDUs to the designated lane and rendering a PDU distance between the first start PDU and the second start PDU to be greater than or equal to a product of a maximum bus width of a lane of the interconnection protocol and a quantity of the plurality of active lanes.

6. The controller of claim 5, wherein the first start PDU and the second start PDU that are allocated each correspond to their respective clock cycles of a clock signal of the controller module; and in the respective clock cycle, there is at most one SOF-included PDU allocated to the designated lane among the plurality of active lanes for sending.

7. The controller of claim 6, wherein the plurality of SOF-included PDUs correspond to a plurality of data frames of a data link layer in the controller module.

8. The controller of claim 5, wherein the interconnection protocol is a Universal Flash Storage (UFS) standard.

9. A storage device, operable to link to a host according to an interconnection protocol, the storage device comprising:

an interface circuit, configured to implement a physical layer of the interconnection protocol so as to link to the host; and a device controller, configured to be coupled to the interface circuit and a storage module, the device controller comprising:

a hardware protocol engine, configured to implement the interconnection protocol, wherein in processing of frame sending by the storage device to the host, the hardware protocol engine performs a plurality of operations, the plurality of operations including:

the hardware protocol engine allocating a first start protocol data unit (PDU) among a plurality of start-of-frame (SOF)-included protocol data units (PDUs) to a designated lane among a plurality of active lanes of the storage device; and the hardware protocol engine allocating a second start PDU among the plurality of SOF-included PDUs to the designated lane and rendering a PDU distance between the first start PDU and the second start PDU to be greater than or equal to a product of a maximum bus width of a lane of the interconnection protocol and a quantity of the plurality of active lanes.

10. The storage device of claim 9, wherein the first start PDU and the second start PDU that are allocated each correspond to their respective clock cycles of a clock signal of the hardware protocol engine; and in the respective clock cycle, there is at most one SOF-included PDU allocated to the designated lane among the plurality of active lanes for sending.

11. The storage device of claim 10, wherein the plurality of SOF-included PDUs correspond to a plurality of data frames of a data link layer in the hardware protocol engine.

12. The storage device of claim 9, wherein the interconnection protocol is a Universal Flash Storage (UFS) standard.

* * * * *